US006289319B1

(12) United States Patent
Lockwood (10) Patent No.: US 6,289,319 B1
(45) Date of Patent: Sep. 11, 2001

(54) AUTOMATIC BUSINESS AND FINANCIAL TRANSACTION PROCESSING SYSTEM

(76) Inventor: Lawrence B. Lockwood, 5935 Folsom Dr., La Jolla, CA (US) 92037

( * ) Notice: Subject to any disclaimer, the term of this patent is extended or adjusted under 35 U.S.C. 154(b) by 0 days.

(21) Appl. No.: 08/347,270

(22) Filed: Nov. 30, 1994

Related U.S. Application Data

(63) Continuation of application No. 08/096,610, filed on Jul. 23, 1993, now abandoned, and a continuation of application No. 07/752,026, filed on Aug. 29, 1991, now abandoned, and a continuation of application No. 07/168,856, filed on Mar. 16, 1988, now abandoned, and a continuation of application No. 06/822,115, filed on Jan. 24, 1986, now abandoned, which is a continuation-in-part of application No. 06/613,525, filed on May 24, 1984, now Pat. No. 4,567,359.

(51) Int. Cl.[7] .................................................. G06F 17/60
(52) U.S. Cl. .............................................................. 705/35
(58) Field of Search ................................... 364/408, 406; 235/381, 380, 379; 705/35, 38, 4

(56) References Cited

U.S. PATENT DOCUMENTS

| | | | |
|---|---|---|---|
| 4,333,152 | * 6/1982 | Best | 395/152 |
| 4,359,631 | * 11/1982 | Lockwood et al. | 235/381 |
| 4,553,206 | * 11/1985 | Smutek et al. | 395/275 |
| 5,146,404 | * 9/1992 | Calloway et al. | 364/401 |

OTHER PUBLICATIONS

Young, G, "Computer firm to help buyer, shop for loan", Washington Post, Virginia, Real Estate Section, Apr. 9, 1984 (Nexis ™ Excerpts).*

* cited by examiner

*Primary Examiner*—Robert Beausoleil
*Assistant Examiner*—X. Chung-Trans
(74) *Attorney, Agent, or Firm*—Henri J. A. Charmasson; John D. Buchaca (57) ABSTRACT

A system for filing applications with an institution from a plurality of remote sites, and for automatically processing said applications in response to each applicant's credit rating obtained from a credit reporting service comprising a series of self-service terminals remotely linked via a telephone line to a first computer at the institution and to a second computer at the credit reporting service headquarters. Each remote terminal comprises a video screen and a video memory which holds image-and-sound-generating information arranged to simulate the aspect and speech of an application loan officer on the video screen. The simulated loan officer is used to acquire loan request data from the applicant by guiding him through an interactive sequence of inquiries and answers. The terminal is programmed to acquire credit rating data relating to the applicant from the credit rating service, and to use the data to compute the credit worthiness of the applicant and the amount which may be loaned to him. The approved loan information is then transmitted to the first computer for further processing by the financial institution.

6 Claims, 5 Drawing Sheets

AUTOMATIC BUSINESS AND FINANCIAL TRANSACTION PROCESSING SYSTEM

PRIOR APPLICATIONS

This is a continuation application of application Ser. No. 08/096,610 filed Jul. 23, 1993 now abandoned, a continuation application of application Ser. No. 07/752,026 filed Aug. 29, 1991 now abandoned, a continuation of application Ser. No. 07/168,856, filed Mar. 16, 1988 now abandoned, a continuation of application Ser. No. 06/822,115, filed Jan. 24, 1986 now abandoned, which is a continuation-in-part of application Ser. No. 06/613,525 filed May 24, 1984, now U.S. Pat. No. 4,567,359, issued Jan. 28, 1986.

BACKGROUND OF THE INVENTION

The present invention relates to automatic self-operated terminals, vending machines, and interactive data processing networks. More specifically, this invention relates to terminals used by banking institutions to make their services available at all hours of the day from various remote locations.

Loan processing has traditionally been a labor-intensive business which represents the major activity of banks and other financial institutions. In the processing of a loan application, numerous forms have to be filled-out, loan officers have to explain payment schedules and generally guide the applicant through the loan application process. The financial institution then has to process the application and either telephone, mail, or communicate acceptance or rejection of the loan in person to the applicant. The complexity of the process has so far prevented the application of automatic terminals to this important part of financial institution activities. Automatic vending machines and self-service terminals have evolved to a high degree of sophistication as disclosed in U.S. Pat. No. 4,300,040 Gould, et al. and U.S. Pat. No. 4,359,631 Lockwood, et al. Yet, this high degree of sophistication has not been put to use in the more complex types of goods and services distribution which requires a great deal of interaction between individuals and institutions.

SUMMARY OF THE INVENTION

The principal object of this invention is to provide an economical means for screening loan applications. When one considers that up to 75% of persons applying for loans fail to meet the financial institution qualification criteria, one realizes that a great deal of labor is required by loan officers before a qualified applicant presents himself.

Another object of the invention is to standardize the reporting and interpretation of credit ratings and their application to loan application processing.

A further object of the invention is to reduce the amount of paperwork and processing time required by each loan application.

It is also an object of the invention to offer a more personal way to apply for credit. Many applicants who would not hesitate to use a mechanical device to place their inquiry are reluctant to inquire about loans requiring face-to-face interaction with a loan officer.

These and other objects are achieved by means of a system that ties together financial institution data processing, the computer services of a credit reporting bureau, and a plurality of remote terminals. Each remote terminal displays the live image of a fictitious loan officer who helps the applicant through an interactive series of questions and answers designed to solicit from the applicant all the information necessary to process his loan application. The terminal can acquire credit rating information about the applicant from the credit reporting bureau and make a decision based on all the information gathered about the credit worthiness of the applicant and the amount of loan to which he is entitled. The loan amount is then communicated to the applicant and to the financial institution for further processing of the loan.

DESCRIPTION OF THE PREFERRED EMBODIMENT OF THE INVENTION

Figure 1:
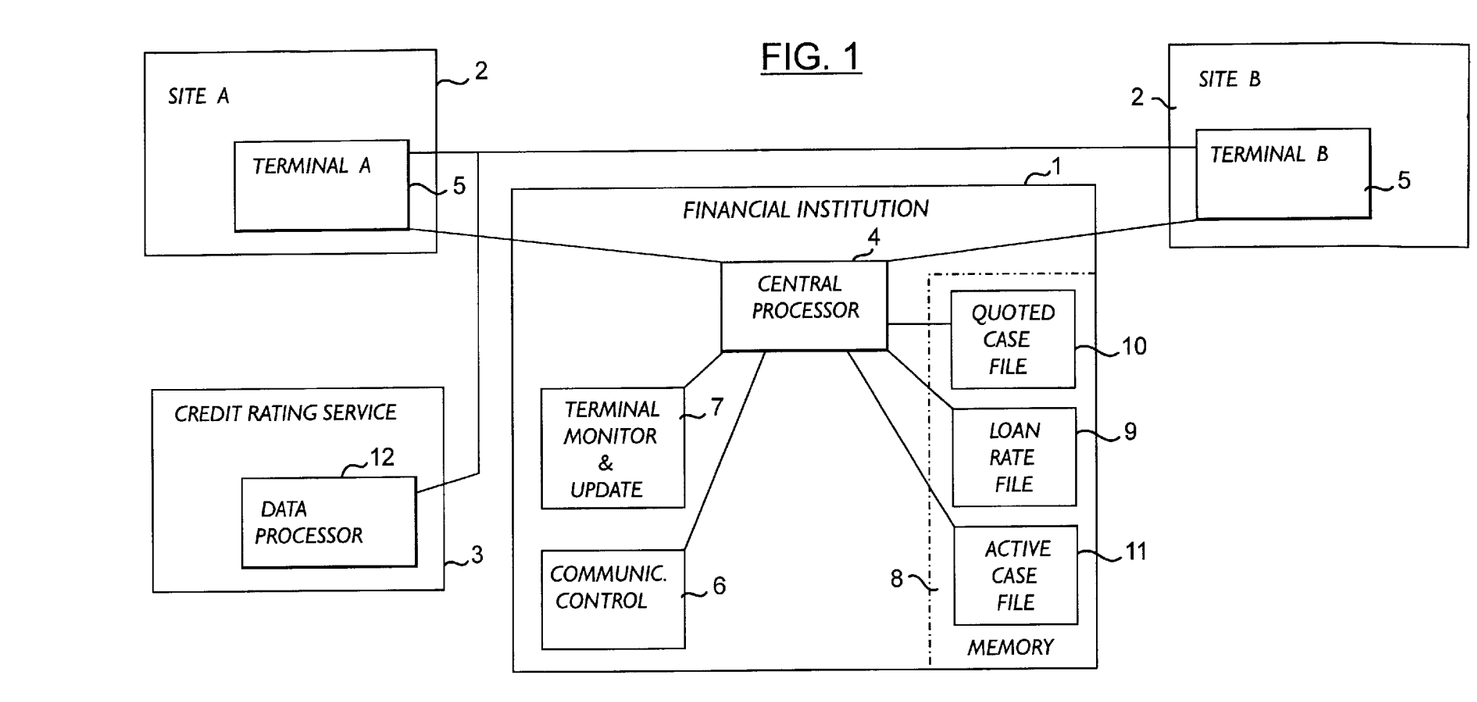
FIG. 1 is a general block diagram of the system for automatically processing loan applications.

Referring now to the drawings, there is shown in FIG. 1 the general block diagram of the automatic loan processing terminal system. The system links a financial institution 1, a plurality of self-service terminals at various remote sites 2 and a credit rating service 3 by telephone lines or other means of telecommunication. The financial institution 1 is provided with a central processor 4 which is used primarily to process loan applications and handle other financial transactions. The central processor 4 has a communication interface which allows it to access the various terminals 5 at the remote sites and be accessed by them at any time of the day. A communication control unit 6 associated with the central processor 4 assures an orderly sending and receiving of information between the terminals and the central processor. The communication control unit 6 provides for a quick transfer of batches of information to and from the terminals 5 under direct access memory mode. Direct access memory modes are achieved by means of high speed data exchange units such as those manufactured by Metacomp, Inc. of San Diego, Calif. and sold under the mark META-PAKS. The central processor 4 is also provided with a terminal monitor and update unit 7 which is programmed for periodically polling the various terminals 5 in order to verify their status and proper operation and to update the data stored in those terminals as may be required. The memory 8 of the central processor 4 holds some files 9 in which are stored information about the various loans available to customers from the institution. This information includes loan rates and repayment schedules. These loans include real estate loans, loans to finance the purchase of automobiles, boats and other vehicles, personal loans secured by certificates of deposit, stocks and other assets controlled by the financial institution 1 and unsecured personal loans. Loan packages which have been quoted to customers are stored in a quoted case file 10 pending acceptance and execution by the applicant. Once a loan has been approved and accepted it is processed and monitored through and active case file 11. The credit rating service 3 is an institution such as TRW CREDENTIAL SERVICE which maintains financial files of consumers based on past and current loan payment obligations, credit card uses and balance sheets provided as part of loan applications, and makes that information available to a membership of merchants and financial institutions who need to access the credit worthiness of a particular customer. The credit rating service information is processed automatically by a data processor 12 equipped with automatic communication interface. This interface allows direct access through telephone lines or other communication networks by any subscribing member. The confidentiality of the credit rating service files is guaranteed by use of identifying codes which must be provided with each request.

The system operates as follows. The central processor 4 of the financial institution 1 periodically sends to the terminals 5 at the various remote sites 2 loan rate information and other data pertinent to the loans available from that institution which are extracted from the loan rate file 9. That information is stored in the various terminals and can be reviewed by an applicant in need of a loan. Once the applicant has selected a type of loan which is available from the institution, he is asked to provide the pertinent personal information data which will be necessary to process his loan application. The information provided by the applicant is supplemented by a financial profile obtained directly from the credit rating service after being automatically requested by the terminal 5. The terminal 5 is programmed to compute the credit worthiness of the applicant and to approve or disapprove the loan. Once the loan has been approved the applicant is requested to accept it or reject it. Accepted loan information is transmitted to the central processor of the financial institution and stored in the active case file 11. Information about loans which have not been accepted on the spot, are also transmitted to the financial institution and stored for a period of time in the quoted case file 10. The customer can return to one of the terminals and accept that loan anytime during the validity period.

Figure 2:
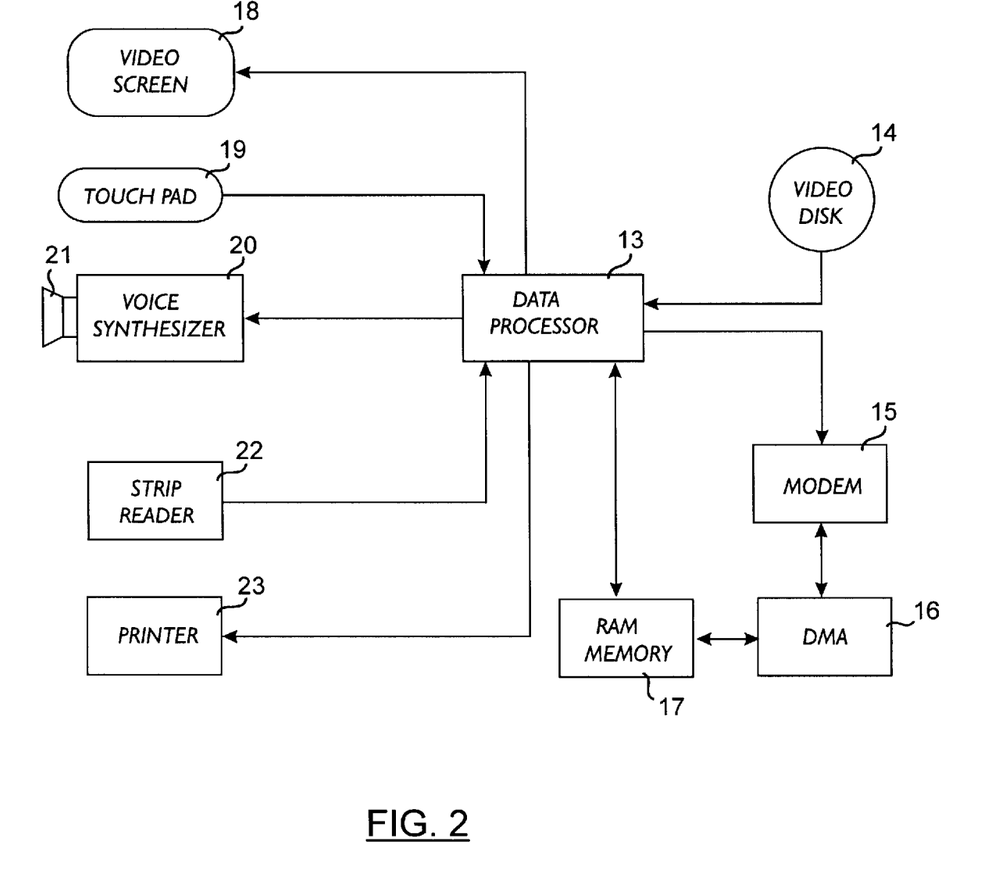
FIG. 2 is a block diagram showing the major components of the terminal.

Turning now to FIG. 2, there is shown a block diagram of the various components of a terminal 5. The operation of the terminal is controlled by a data processor 13. To the left of the processor, various blocks represent the peripheral equipment which interfaces with the applicant. To the right of the processor there is shown a videodisc 14 on which are stored all the permanent data necessary for the operation of the terminal including the data necessary to effectuate the interactive and automatic request of information by the terminal from the applicant. A modem 15 provides a two-way communication channel with the financial institution 1 and the credit rating service 3. The modem is controlled by the data processor 13 and handles a batch of information through a direct memory access unit 16, to and from a RAM memory 17. Thus, the RAM memory can be used to hold data obtained from the loan rate files 9 at the financial institution as well as applicant's financial profiles obtained from the credit rating service 3. The RAM memory can also be used to store some of the operating routines necessary for the operation of the terminal.

Communication with the applicant is done mainly through the video screen 18. The video screen 18 displays the picture of a fictitious loan officer who informs the applicant about the various types of loans available as well as the manner in which the application can be filed. The applicant answers the request of a loan officer by means of a touch pad 19 or a keyboard. Any entry made by the applicant on the touch pad 19 is processed and orally repeated immediately by means of a voice synthesizer 20 and loud speaker 21. The oral expression of the answers provided by the applicant is a way to assure that no false entry is made. A magnetic strip reader 22 may be provided so that the applicant can give an account number or an identification by means of a credit card. A printer 23 is used to deliver to the applicant a hard copy of any loan quotation as well as a confirmation of his accepted loan.

Figure 3:
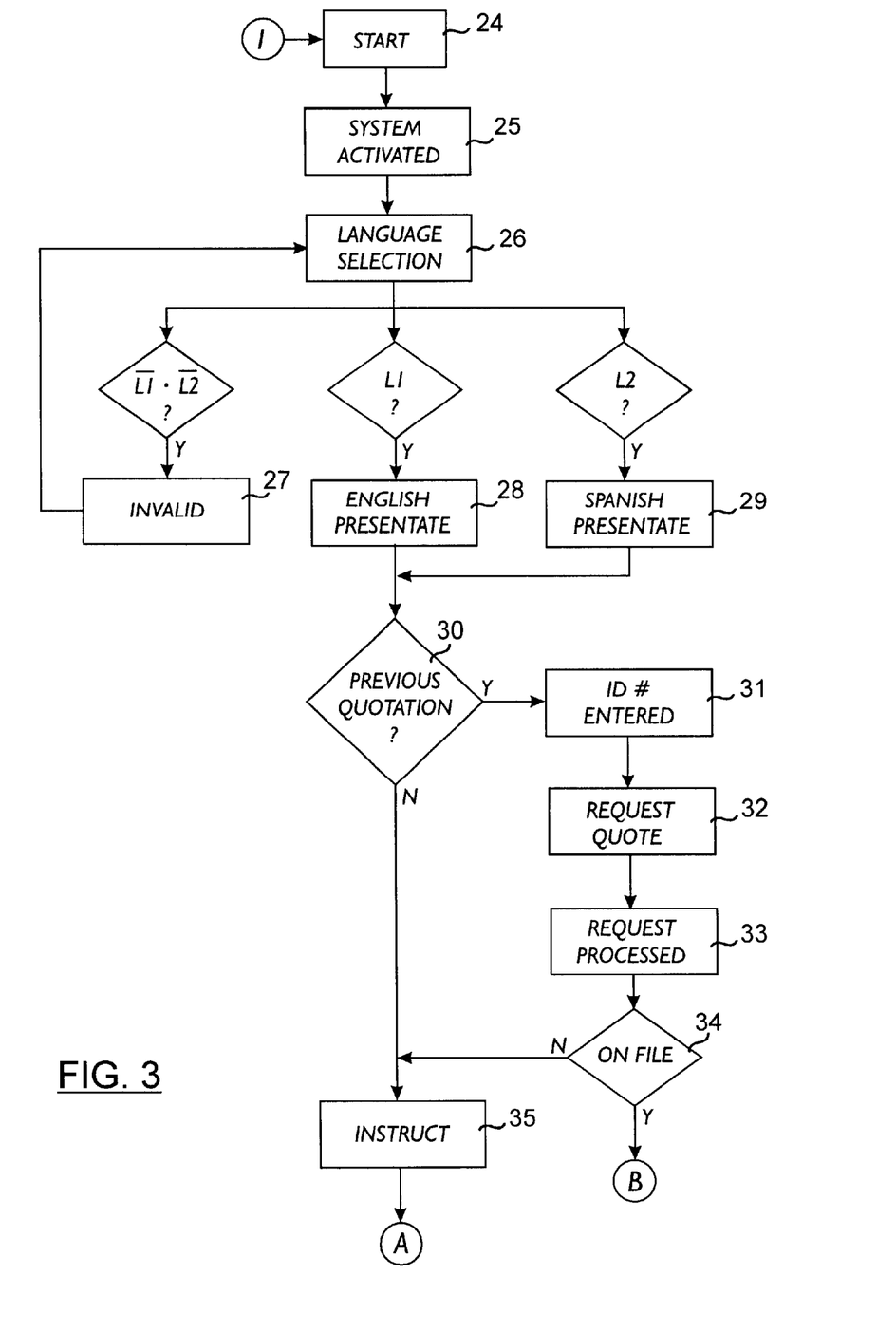
FIGS. 3 to 5 are detailed flow diagrams of the system operation.

FIG. 3 is a flow diagram of the system operation during the initial phase of the loan application process. The start 24 of system operation is triggered either by the applicant pushing a start button or by the automatic detection of his presence in front of the terminal. Once the system is activated 25 the recording of an image and sound of a fictitious loan officer is read from the videodisc 14 and appears on the video screen 18. The fictitious loan officer takes the applicant through a language selection routine 26–29. In this case, the applicant is asked in both English and Spanish in what language the loan transaction is to be conducted. In this phase of the operation as well as all interactive communications between the loan officer and the applicant, the loan officer explains to the applicant how to enter his answer by means of the touch pad 19. The applicant is then asked whether a previous quotation has already been prepared for him 30. In the affirmative, he is then requested 31 to enter a pass number or identification number either by entering the number on the touch pad or by running his credit I.D. card through the strip reader 22. The terminal then addresses the financial institution and requests 32 the prior loan quotation stored in the quoted case file 10 of the central processor 4. This is done by the data processor 13 of the terminal dialing the institution phone number through the modem 15 and sending a request message. The terminal goes into a standby mode with its DMA unit 16 waiting for a transfer of information from the line into the RAM memory 17. The continued operation depends on whether or not the previous quotation is found 34 to be on file. If the answer is negative, the fictitious loan officer instructs 35 the applicant how to proceed to apply for a loan. In the case where a previous quotation is found to be on file, that quotation is transferred to the terminal according to the program routine B illustrated in FIG. 5.

Figure 4:
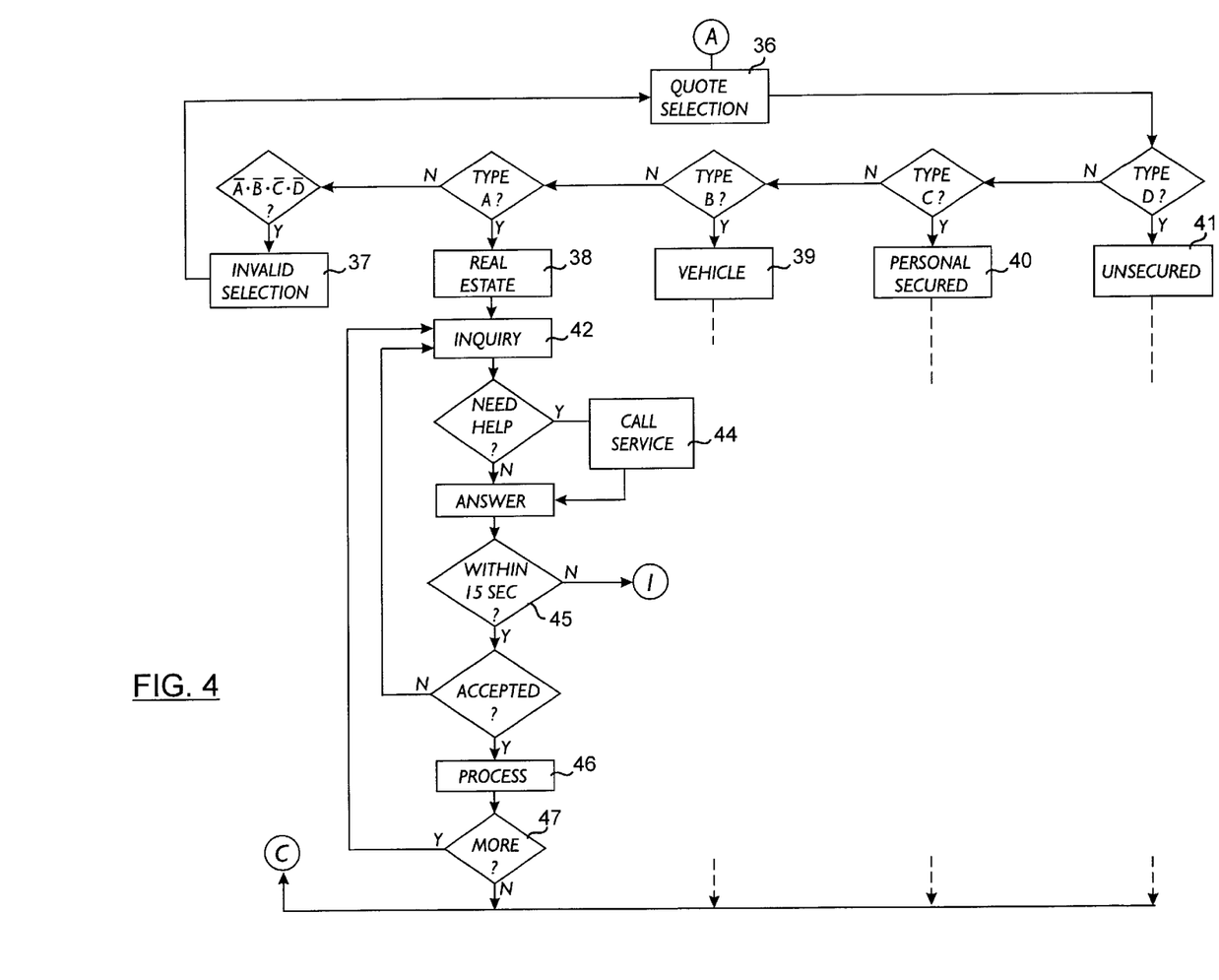

FIG. 4 is the flow diagram of the system operation during the acquisition of information by the terminal from the applicant. The applicant is first asked to select 36 the type of loan in which he is interested. In this case, he is offered a menu allowing him to choose between a real estate loan 38, a vehicle loan 39, a personal loan 40 secured by an asset held by the financial institution or a personal unsecured loan 41. Any invalid selection 37 triggers a new request. Once a type of loan has been selected, a real estate loan for example, the fictitious loan officer asks a series of inquiries corresponding to the questions that would be found on a standard loan application form. For each question, the system performs a subroutine 42–45 designed to guarantee proper input of the information into the terminal memory 17. If a problem develops during the question and answer period, the applicant is invited to call 44 the loan service at the financial institution. If the answer to a question is not received within fifteen seconds 45, the process of application is presumed to have been abandoned by the applicant and the system returns to its initial standby state. Once all the proper answers have been accepted, they are processed 46 by the terminal data processor 13. This process may involve analyzing certain key answers in order to identify any element or data that would automatically disqualify the applicant. Depending upon the result of that first analysis, more questions 47 may be presented to the applicant in order to refine the data necessary for a thorough assessment of his qualifications.

Figure 5:
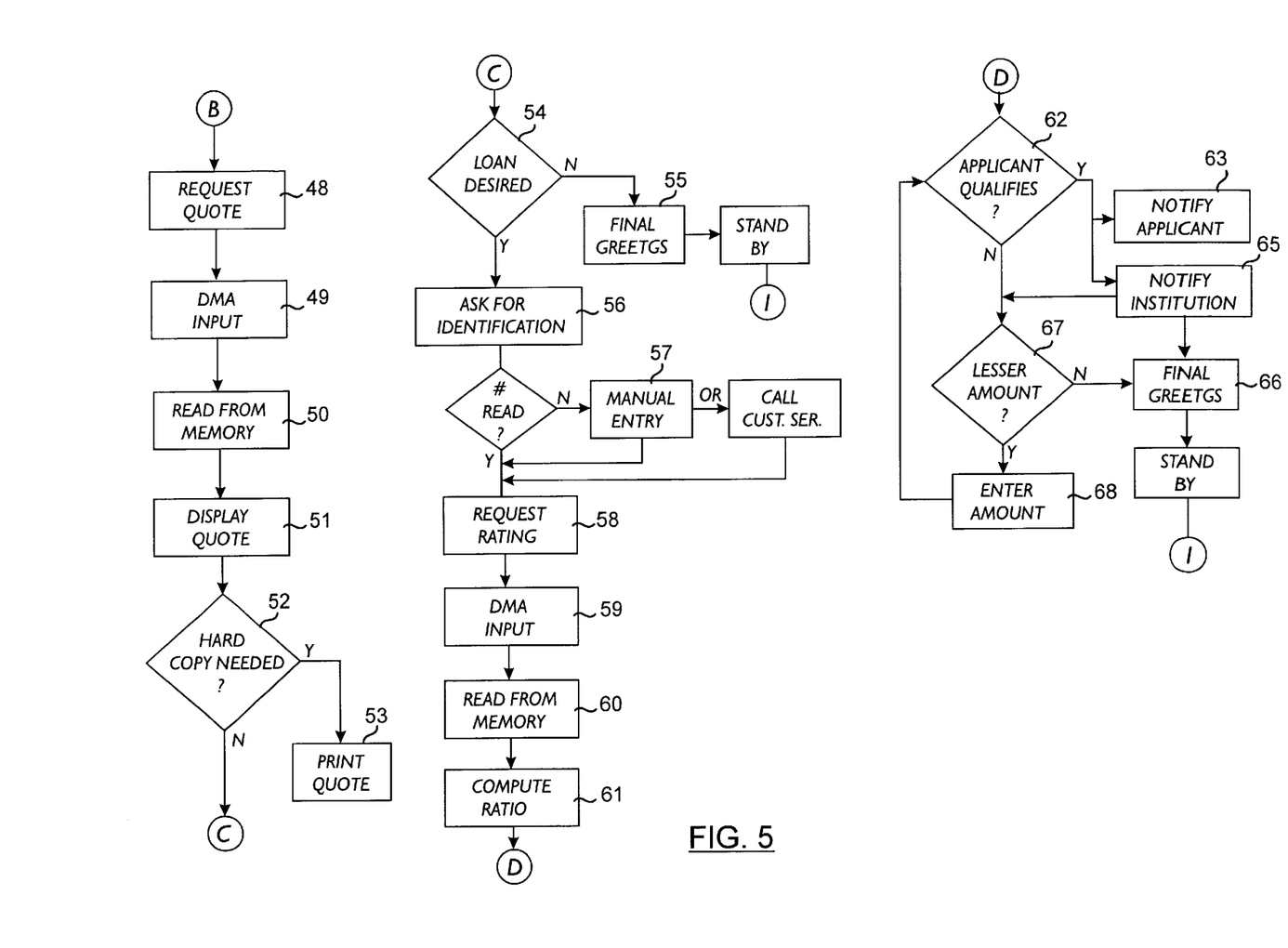

Turning now to FIG. 5, the B subroutine used to receive a previous quotation from the financial institution is illustrated in the first flow diagram. Once the previous quotation is requested 48 the DMA unit 16 of the terminal is allowed to receive a batch of information containing the previous quotation. This batch of information is stored in the RAM memory 17 from where it is fetched 50 and displayed 51 on the video screen 18. The applicant is then asked if he wants a hard copy 52 of the quotation. In the affirmative, the previous quotation is printed 53 on printer 23. The second flow diagram corresponds to the acquisition of the applicant's financial profile from the credit rating service 3. Once a loan quotation has been presented to thus applicant he is asked whether or not he wants to apply for the loan 54. If his answer is negative, the fictitious loan officer expresses final greetings 55. The loan quotation, if not already in storage at the financial institution, is transmitted there for temporary storage in the quoted case file 10 of the central processor 4. If the applicant wishes to apply for the loan, he is asked to provide a password or identification 56 which will allow the terminal to access his file at the credit rating service 3. As previously explained, this number can be entered directly by means of an identification card run through the strip reader 22 or entered manually 57 by means of the touch pad 19. The terminal requests a rating 58 from the credit rating service 3 in a manner similar to the one used and described previously for obtaining a previous quotation from the financial institution. The applicant's financial profile is received as a batch of information through the DMA unit 59 and then read from the memory 60. The financial profile is then analyzed by the terminal in order to compute 61 a debt ratio or other criterion devised by the financial institution to access the credit worthiness of the applicant. The debt ratio is the ratio of the applicant's current expenses to his current income. Other parameters such as debt to equity ratio or fixed assets to debt may be computed by the terminal data processor 13 and used in determining the qualifications of the applicant. It should be noted that the entire decision whether or not to grant the loan is performed automatically and onsite by the terminal 5 without intervention whatsoever from any of the financial institution personnel, except in case of a breakdown in communications by requesting a direct phone call by the applicant to the financial institution.

The last flow diagram on the drawing represents the final phase of the loan application transaction. Once the terminal equipment has determined that the applicant qualifies 62 for the loan, the applicant is so notified 63, and instructed how to obtain the loan funds. The institution is also notified 65, and the loan is processed through the active case file 11 by the central processor 4. The fictitious loan officer closes the transaction by giving his final greetings 66 before the system is returned to a standby condition. If the applicant does not qualify for the amount of loan requested, he is first asked whether a lesser amount 67 would be acceptable to him. He is then instructed to enter the lesser amount 68 through the touch pad 19. That new amount is then checked against the determination already made by the terminal. The process is repeated until an acceptable amount is requested by the applicant, or until such time as the applicant declines to proceed with the loan application.

It should be noted that the system as described could be applied to other forms of transactions in which information has to be acquired from a customer then processed to a decision or into the performance of a particular task. A similar system could be used, for instance, for the preparation and filing of income tax returns. In such case, the assistance that the fictitious person who appears on the video screen can give to the applicant in filling-out the tax form can be easily programmed on the videodisc.

Other applications of the system include the selection and purchase of stocks and other securities, the selection and opening of so-called "self-directed investments" such as Individual Retirement Accounts, and other complex transactions which normally require a great deal of time and attention on the part of the officers of an institution.

While the preferred embodiment of the invention has been described and other modifications have been suggested, other embodiments may be devised without departing from the spirit of the invention and the scope of the appended claims.

What is claimed is:

1. An automatic data processing system for processing business and financial transactions between entities from remote sites which comprises:
   a central processor programmed and connected to process a variety of inquiries and orders transmitted from said remote sites;
   said central processor including:
      means for receiving information about said transactions from said remote sites;
      means for retrievably storing said information;
      at least one terminal at each of said remote sites including a data processor and operational sequencing lists of program instructions;
      means for remotely linking said terminal to said central processor and for transmitting data back and forth between said central processor and said terminal;
   said terminal further comprising means for dispensing information and services for at least one of said entities including:
      a video screen;
      means for holding operational data including programing, informing, and inquiring sequences of data;
      means for manually entering information;
      means for storing information, inquires and orders for said transactions entered by one of said entities via said means for manually entering information, and data received through and from said central processor;
      on-line means for transmitting said information, inquiries, and orders to said central processor;
      on-line means for receiving data comprising operator-selected information and orders from said central processor via said linking means;
      means for outputting said informing and inquiring sequences on said video screen in accordance with preset routines and in response to data entered through said means for entering information;
      means for controlling said means for storing, means for outputting, and means for transmitting, including means for fetching additional inquiring sequences in response to a plurality of said data entered through said means for entering and in response to information received from said central processor;
      said informing sequences including directions for operating said terminal, and for presenting interrelated segments of said operational data describing a plurality of transaction operations;
      said programming sequences including means for interactively controlling the operation of said video screen, data receiving and transmitting means; and for selectively retrieving said data from said means for storing;
      said means for storing comprising means for retaining said operational sequencing list and means responsive to the status of the various means for controlling their operation;
   said central processor further including:
      means responsive to data received from one of said terminals for immediately transmitting selected stored information to said terminal; and means responsive to an order received from a terminal for updating data in said means for storing;

whereby said system can be used by said entities, each using one of said terminals to exchange information, and to respond to inquiries and orders instantaneously and over a period of time.

2. The system of claim 1, wherein said terminal further comprises means for generating a personal qualification report including means for determining the type and amount of goods or services which can be provided to an entity wherein said means for determining comprises means for mathematically processing said information entered through said means for entering.

3. The system of claim 1, wherein said inquiring and informing sequences of data comprise textual and graphical data.

4. The system of claim 3, wherein said means for outputting further comprise means for generating audible informing and inquiring messages.

5. The system of claim 4, wherein said means for outputting further comprise means for synchronizing said audible messages with said textual and graphical data.

6. The system of claim 3, wherein said means for holding comprise an optical disc.

* * * * *

US006289319C1

(12) EX PARTE REEXAMINATION CERTIFICATE (5817th)
United States Patent
Lockwood (10) Number: US 6,289,319 C1
(45) Certificate Issued: Jul. 17, 2007

(54) AUTOMATIC BUSINESS AND FINANCIAL TRANSACTION PROCESSING SYSTEM

(76) Inventor: Lawrence B. Lockwood, 5935 Folsom Dr., La Jolla, CA (US) 92037

Reexamination Request:
No. 90/006,623, May 5, 2003

Reexamination Certificate for:
Patent No.: 6,289,319
Issued: Sep. 11, 2001
Appl. No.: 08/347,270
Filed: Nov. 30, 1994

Related U.S. Application Data (63) Continuation of application No. 08/096,610, filed on Jul. 23, 1993, now abandoned, and a continuation of application No. 07/752,026, filed on Aug. 29, 1991, now abandoned, and a continuation of application No. 07/168,856, filed on Mar. 16, 1988, now abandoned, and a continuation of application No. 06/822,115, filed on Jan. 24, 1986, now abandoned, which is a continuation-in-part of application No. 06/613,525, filed on May 24, 1984, now Pat. No. 4,567,359.

(51) Int. Cl.
*G06Q 40/00* (2006.01)

(52) U.S. Cl. ............................. 705/35; 705/1; 705/38; 705/39

(58) Field of Classification Search ..................... 705/1, 705/30–40; 707/1, 4, 6, 102; 706/20, 21; 715/700
See application file for complete search history.

(56) References Cited

PUBLICATIONS

"Electronic Mail", American Media Group 1986.*
Viewdata, "First World Conference on Viewdata & Tele-Text", Mar. 26–28, 1980, London, published by Online Conferences Ltd., Northwood Hills, Middx.*
Comp–U–Store System Could Change Retail Economics, Interview with Erik Shelton, president Consumer Electronic Service, Jul. 1983.*
GloveCom 1982, IEEE Global Communications Conference, Conference Record, vol. 3 of 3, LC 82–82566, IEEE Catalog No. 82CH1819–2.*
"CD Airs Electronic Catalog on Toronto", Discount Store News, The Newspaper of the Discount Department Store Industry, vol. 22, No. 3, published Biweekly, by Arthur Markowitz, Feb. 7, 1983.*
Prestel 1980, Sample images of Prestel 1980.*
Kleinberg, "How Video Will Change the Sale", Apr. 1981, Industrial Marketing.*
IVIS Puts the Power of Sight, Sound and Touch Into Your Information Picture, 1984. Digital Equipment Corporation.*
"P–oP Video disc Devices Help Clerk Sells More Products", Merchandising, Jan. 1984.*
"Improving Retail Productivity", How Retailers and Suppliers Can Improve Their Use of Stock, Space, Staff and System, An Iris executive conference, Thursday Oct. 20, 1983.*
Browning, Graeme, UPI Business Writer, UPSI, Regional News, Nov. 1, 1983, Tuesday, BC cycle.*

* cited by examiner

*Primary Examiner*—Frantzy Poinvil (57) ABSTRACT

A system for filing applications with an institution from a plurality of remote sites, and for automatically processing said applications in response to each applicant's credit rating obtained from a credit reporting service comprising a series od self-service terminals remotely linked via a telephone line to a first computer at the institution and to a second computer at the credit reporting service headquarters. Each remote terminal comprises a video screen and a video memory which holds image-and-sound-generating information arranged to simulate the aspect and speech of an application loan officer on the video screen. The simulated loan officer is used to acquire loan request data from the applicant by guiding him through an interactive sequence of inquiries and answers. The terminal is programmed to acquire credit rating data relating to the applicant from the credit rating service, and to use the data to compute the credit worthiness of the applicant and the amount which may be loaned to him. The approved loan information is then transmitted to the first computer for further processing by the financial institution.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–6, dependent on an amended claim, are determined to be patentable.

New claims 7–28 are added and determened to be patentable.

+ig
1. An automatic data processing system for processing business and financial transactions between entities from remote sites which comprises:
   a central processor programmed and connected to process a variety of inquiries and orders transmitted from said remote sites;
   said central processor including:
      means for receiving information about said transactions from said remote sites;
      means for retrievably storing said information;
      at least one terminal at each of said remote sites including a data processor and operational sequencing lists of program instructions;
      means for remotely linking said terminal to said central processor and for transmitting data back and forth between said central processor and said terminal;
   said terminal further comprising means for dispensing information and services for at least one of said entities including:
      a video screen;
      means for holding operational data including programing, informing, and inquiring sequences of data;
      means for manually entering information;
      means for storing information, [inquires] *inquiries* and orders for said transactions entered by one of said entities via said means for manually entering information, and data received through and from said central processor;
      on-line means for transmitting said information, inquiries, and orders to said central processor;
      on-line means for receiving data comprising operator-selected information and order from said central processor via said linking means;
      means for outputting said informing and inquiring sequences on said video screen in accordance with preset routines and in response to data entered through said means for entering information;
      means for controlling said means for storing, means for outputting, and means for transmitting, including means for fetching additional inquiring sequences in response to a plurality of said data entered through said means for entering and in response to information received from said central processor;
      said informing sequences including directions for operating said terminal, and for presenting interrelated segments of said operational data describing a plurality of transaction operations;
      said programming sequences including means for interactively controlling the operation of said video screen, data receiving and transmitting means; and for selectively retrieving said data from said means for storing;
   said means for storing comprising means for retaining said operational sequencing list and means responsive to the status of the various means for controlling their operation;
   said central processor further including:
      means responsive to data received from one of said terminals for immediately transmitting selected stored information to said terminal; and
      means responsive to an order received from a terminal for updating data in said means for storing;
      whereby said system can be used by said entities, each using one of said terminals to exchange information, and to respond to inquiries and orders instantaneously and over a period of time.

7. The system of claim 1, wherein said means for storing comprise a Random Access Memory associated with said data processor.

8. The system of claim 1, wherein said means for holding operational data comprise a mass memory device.

9. The system of claim 8, wherein said mass memory device comprises a storage disk.

10. The system of claim 1, wherein said programming sequences comprise operational data received from said central processor for selecting program instructions from said means for storing and said means for holding, and executing said program instructions.

11. The system of claim 1, wherein said inquiring sequences comprise questions to be presented to an operator of said terminal.

12. The system of claim 11 which further comprises means for presenting said questions in audio-visual form.

13. The system of claim 12, wherein said audio-visual form comprises images of a fictitious person.

14. The system of claim 1, wherein said transactions comprise purchase of stock and securities.

15. The system of claim 1, wherein said transactions comprise filing of income tax returns.

16. The system of claim 1, wherein said transactions comprise obtaining a loan.

17. The system of claim 1, wherein said transactions comprise opening of an investment account.

18. The system of claim 1, wherein said dispensing information and services comprises displaying information received from said central processor.

19. The system of claim 1, wherein said preset routines are held in said means for storing.

20. The system of claim 1, wherein said means for controlling is operative to direct at least one of said inquiring sequence to said central processor.

21. The system of claim 3, wherein said textual data comprises letters, words, phrases and numbers.

22. The system of claim 3, wherein said graphical data comprise business and financial transaction forms.

23. The system of claim 3, wherein said graphical data further comprises business and financial charts.

24. The system of claim 1, wherein said business and financial transactions are performed by an agent of said entity.

25. The system of claim 1, wherein said means for transmitting comprise a communication network.

26. The system of claim 25, wherein said communication network comprises a telephone line.

27. The system of claim 1, wherein said directions for operating said terminal, and for presenting interrelated segments of said operational data describing a plurality of transaction operations comprise menus.

28. The system of claim 11, wherein said questions are presented as menus.

* * * * *

US006289319C2

(12) EX PARTE REEXAMINATION CERTIFICATE (9470th)

United States Patent
Lockwood (10) Number: US 6,289,319 C2
(45) Certificate Issued: Jan. 9, 2013

(54) AUTOMATIC BUSINESS AND FINANCIAL TRANSACTION PROCESSING SYSTEM

(76) Inventor: Lawrence B. Lockwood, La Jolla, CA (US)

Reexamination Request:
No. 90/012,641, Sep. 14, 2012

Reexamination Certificate for:
Patent No.: 6,289,319
Issued: Sep. 11, 2001
Appl. No.: 08/347,270
Filed: Nov. 30, 1994

Reexamination Certificate C1 6,289,319 issued Jul. 17, 2007

Related U.S. Application Data

(63) Continuation of application No. 08/096,610, filed on Jul. 23, 1993, now abandoned, and a continuation of application No. 07/752,026, filed on Aug. 29, 1991, now abandoned, and a continuation of application No. 07/168,856, filed on Mar. 16, 1988, now abandoned, and a continuation of application No. 06/822,115, filed on Jan. 24, 1986, now abandoned, which is a continuation-in-part of application No. 06/613,525, filed on May 24, 1984, now Pat. No. 4,567,359.

(51) Int. Cl.
*G06Q 40/00* (2006.01)

(52) U.S. Cl. ............ 705/35; 705/1.1; 705/38; 705/39

(58) Field of Classification Search .................. None
See application file for complete search history.

(56) References Cited

To view the complete listing of prior art documents cited during the proceeding for Reexamination Control Number 90/012,641, please refer to the USPTO's public Patent Application Information Retrieval (PAIR) system under the Display References tab.

*Primary Examiner* — Karin Reichle (57) ABSTRACT

A system for filing applications with an institution from a plurality of remote sites, and for automatically processing said applications in response to each applicant's credit rating obtained from a credit reporting service comprising a series of self-service terminals remotely linked via a telephone line to a first computer at the institution and to a second computer at the credit reporting service headquarters. Each remote terminal comprises a video screen and a video memory which holds image-and-sound-generating information arranged to simulate the aspect and speech of an application loan officer on the video screen. The simulated loan officer is used to acquire loan request data from the applicant by guiding him through an interactive sequence of inquiries and answers. The terminal is programmed to acquire credit rating data relating to the applicant from the credit rating service, and to use the data to compute the credit worthiness of the applicant and the amount which may be loaned to him. The approved loan information is then transmitted to the first computer for further processing by the financial institution.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-28 is confirmed.

* * * * *